US007039131B2

(12) United States Patent
Banerjea

(10) Patent No.: US 7,039,131 B2
(45) Date of Patent: May 2, 2006

(54) CARRIER FREQUENCY OFFSET ESTIMATION IN A WIRELESS COMMUNICATION SYSTEM

(75) Inventor: Raja Banerjea, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/625,028

(22) Filed: Jul. 22, 2003

(65) Prior Publication Data

US 2004/0120412 A1   Jun. 24, 2004

Related U.S. Application Data

(60) Provisional application No. 60/400,819, filed on Aug. 2, 2002.

(51) Int. Cl.
*H04L 27/38* (2006.01)
*H04L 27/28* (2006.01)
*H04L 27/22* (2006.01)

(52) U.S. Cl. .................. 375/326; 375/260; 375/344
(58) Field of Classification Search ................ 375/229, 375/262, 232, 329, 334, 341, 346, 326, 350, 375/260, 344; 370/208, 210, 206
See application file for complete search history.

(56) References Cited

U.S. PATENT DOCUMENTS

| 5,940,450 A * | 8/1999 | Koslov et al. ............... 375/344 |
| 2003/0231718 A1 * | 12/2003 | Jiang ........................... 375/326 |
| 2004/0001427 A1 * | 1/2004 | Belotserkovsky et al. .. 370/208 |

OTHER PUBLICATIONS

Kataoka et al. "Adaptive Equalizer Including Frequency-Offset Compensator for Multi-Carrier Communication Systems", IEEE Symposium on PIMRC '98, Sep. 1998, vol. 3, pp. 1076-1080.*

Terry et al. "OFDM Wireless LANs: A Theoretical and Practical Guide", Sams Publishing, Dec. 11, 2001, ISBN 0-672-32157-2, pp. Chapter 2.*

D-S. Han et al., "Fast Carrier Frequency Offset Compensation in OFDM Systems," IEEE Transactions on Consumer Electronics, vol. 47, No. 3, pp. 364-369, Aug. 2001.

F. Yanzeng et al., "Frequency Synchronization in OFDM Systems," 3G Mobile Communication Technologies, Conference Publication No. 477, pp. 92-98, Mar. 2001.

Y.H. Kim et al., "An Efficient Frequency Offset Estimator for OFDM Systems and Its Performance Characteristics," IEEE Transactions on Vehicular Technology, vol. 50, No. 5, Sep. 2001.

* cited by examiner

*Primary Examiner*—Betsy L. Deppe

(57) ABSTRACT

An OFDM receiver includes a demodulator for receiving a passband signal having multiple symbols, one or more of the symbols being a reference symbol, and for converting the passband signal to a baseband signal, a CFO compensation circuit for receiving the baseband signal and modifying a phase of the baseband signal in response to a first control signal, a transformation circuit for translating the baseband signal from the CFO compensation circuit into a frequency domain constellation, an equalizer for receiving the frequency domain constellation and modifying the frequency domain constellation based at least in part on the reference symbol, and a CFO estimation circuit coupled between an output of the equalizer and the CFO compensation circuit in a feedback configuration. The CFO estimation circuit is capable of measuring a difference in phase error between multiple symbols received from the equalizer and generating the first control signal, which is representative of the measured phase error difference.

21 Claims, 2 Drawing Sheets

CARRIER FREQUENCY OFFSET ESTIMATION IN A WIRELESS COMMUNICATION SYSTEM

CROSS REFERENCE TO RELATED APPLICATION

This application claims the benefit of U.S. Provisional Application Ser. No. 60/400,819 filed on Aug. 2, 2002, the disclosure of which is incorporated herein by reference.

FIELD OF THE INVENTION

The present invention relates generally to wireless communication systems, and more particularly relates to estimating carrier frequency offset (CFO) in a wireless communication system.

BACKGROUND OF THE INVENTION

Many wireless communication systems, such as, for example, wireless local area network (WLAN) systems, digital subscriber line (DSL) modems, digital audio broadcasting (DAB) systems, etc., employ orthogonal frequency division multiplexing (OFDM) for data transmission. The Institute of Electrical and Electronics Engineers (IEEE) 802.11 standard addresses medium access control over a wireless local area network (WLAN). The IEEE 802.11 standard is set forth in the document IEEE Std. 802.11, entitled *Supplement to IEEE Standard for Information Technology—Telecommunications and Information Exchange Between Systems—Local Metropolitan Area Networks—Specific Requirements—Part 11: Wireless LAN Medium Access Control (MAC) and Physical Layer (PHY) Specifications*, 1999 Edition, which is incorporated herein by reference. Additional extensions relating to the 802.11 standard, including IEEE Std. 802.11a, entitled *High Speed Physical Layer in the 5 GHz Band*, February 2000, and IEEE Std. 802.11g, entitled *Further Higher Data Rate Extension in the 2.4 GHz Band, September* 2000, also incorporated herein by reference, relate to WLAN systems which use OFDM technology in the 5 gigahertz (GHz) and 2.4 GHz frequency bands, respectively.

An OFDM system was proposed, for example, in R. W. Chang, "Synthesis of band-limited orthogonal signals for multi-channel data transmission," *Bell Systems Technical Journal*, vol. 45, pp. 1775–1796, December 1966. OFDM systems provide orthogonal sub-carriers that guarantee exact reconstruction of the original data. Such systems also provide a higher degree of immunity to multi-path distortion and selective fading of channels as compared to single carrier systems. However, OFDM systems are also susceptible to errors relating to carrier frequency offset (CFO). CFO generally arises when the demodulation carrier frequency does not exactly match the modulating carrier frequency. This may result from, for example, Doppler effect or mismatched crystal frequency at the transmitter and receiver. CFO essentially destroys the orthogonality of the OFDM symbol and can cause inter-carrier interference (ICI) and inter-symbol interference (ISI).

Numerous techniques have been proposed for CFO estimation and correction in OFDM systems. See, e.g., Dong-SeogHan, Jae-Hyun Seo and Jung-JinKim, "Fast Carrier Frequency Offset Compensation in OFDM Systems," *IEEE Transactions on Consumer Electronics*, vol. 47, no. 3 (August 2001), Fu Yanzeng, Zhang Hailin, Wang Yumin, "Frequency Synchronization in OFDM Systems," 3*G Mobile Communication Technology*, pp. 26–28, March 2001, Conference Publication No. 477, Yun Hee Kim, Iichko Song, Seokho Yoon and So Ryoung Park, "An Efficient Frequency Offset Estimator for OFDM Systems and its Performance Characteristics," *IEEE Transactions on Vehicular Technology*, vol. 50, no. 5 (September 2001), all of which are incorporated herein by reference.

In an attempt to compensate for the undesirable effects of CFO error, the WLAN standard provides short and long training symbols to estimate CFO. Most conventional OFDM systems employ coarse and fine CFO detection and estimation using the periodic sequences sent during training. However, even a small detection error in CFO can undesirably impact the system, such as, for example, by causing a substantial reduction in signal-to-noise ratio (SNR).

There exists a need, therefore, for an improved technique that more accurately estimates CFO in a wireless communication system, without suffering from the problems exhibited by conventional wireless systems.

SUMMARY OF THE INVENTION

The present invention provides techniques for improved CFO estimation in a wireless communication system, such as, for example, a WLAN. The techniques of the invention may be implemented in an OFDM receiver associated with the wireless communication system and, in accordance with one aspect of the present invention, include a data mode CFO tracking methodology. The CFO estimation techniques of the invention provide superior performance over conventional CFO estimation schemes, especially in a multipath environment.

In accordance with one embodiment of the present invention, an OFDM receiver comprises a demodulator configurable for receiving a passband signal including a plurality of symbols, at least one of the symbols being a reference symbol, and for converting the passband signal to a baseband signal, a CFO compensation circuit configurable for receiving the baseband signal and modifying a phase of the baseband signal in response to a first control signal, a transformation circuit configurable for translating the baseband signal from the CFO compensation circuit into a frequency domain constellation, an equalizer configurable for receiving the frequency domain constellation and modifying the frequency domain constellation based at least in part on the reference symbol, and a CFO estimation circuit operatively coupled between an output of the equalizer and the CFO compensation circuit in a feedback configuration. The CFO estimation circuit is configurable for measuring a difference in phase error between at least two symbols received from the equalizer and for generating the first control signal, the first control signal being representative of the measured phase error difference.

These and other features and advantages of the present invention will become apparent from the following detailed description of illustrative embodiments thereof, which is to be read in connection with the accompanying drawings.

DETAILED DESCRIPTION OF THE PREFERRED EMBODIMENTS

The present invention will be described herein in the context of an IEEE 802.11 compliant orthogonal frequency division multiplexing (OFDM) wireless communication system. It should be appreciated, however, that the present invention is not limited to this or any particular wireless communication system. Rather, the invention is more generally applicable to techniques for improving CFO estimation in a wireless communication system. Also, although particularly well-suited for use in conjunction with the IEEE 802.11 standard, the invention can be used with other standards, as well as in non-standard systems.

Figure 1:
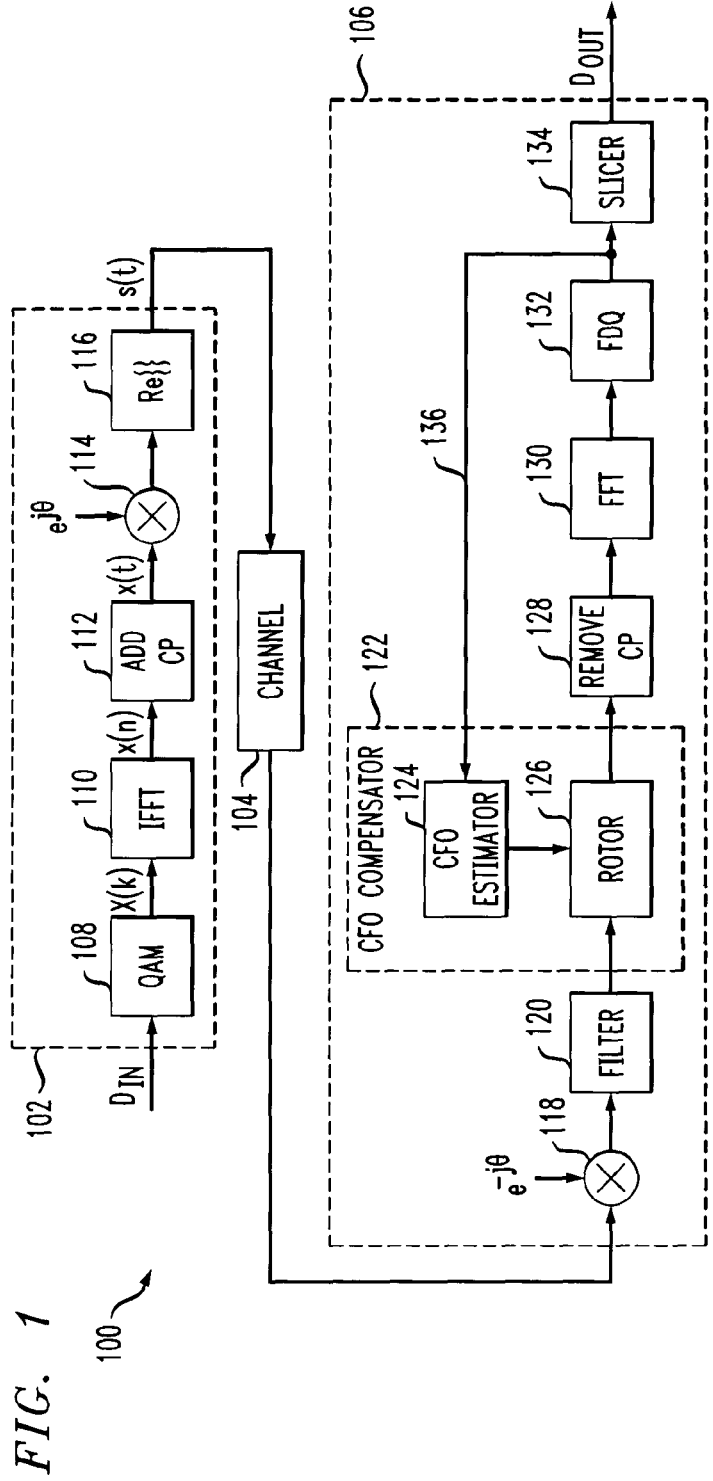
FIG. 1 is a block diagram depicting an exemplary OFDM system in which the techniques of the present invention are implemented, in accordance with an illustrative embodiment of the invention.

FIG. 1 depicts an exemplary OFDM system 100 in which the techniques of the present invention are implemented. The exemplary OFDM system 100 includes a transmitter 102 configurable for sending a signal to a receiver 106 via a communication channel 104. It is to be appreciated that a transmitter 102 and a receiver 106 may be integrated together, such as, for example, in a WLAN modem, and configurable for operation in a transmission mode, a reception mode, or both. The term "communication channel" as used herein is intended to include a wireless communication link, such as, for example, cellular, radio frequency (RF), microwave, satellite, etc., and may also include a dedicated communication line, such as, for example, telephone, cable, fiber optic, etc. A channel may have a certain data rate associated therewith which determines how many samples per second can be transmitted on that particular media. Lower rate channels can be aggregated into a single higher rate channel by using, for example, multiplexers, as understood by those skilled in the art. Likewise, lower rate channels can be extracted from a higher rate channel by using, for example, demultiplexers.

For ease of explanation, the illustrative transmitter 102 may be described in terms of functional blocks, including a quadrature amplitude modulation (QAM) block 108 coupled to an input of the transmitter, an inverse fast Fourier transform (IFFT) block 110 coupled to the QAM block 108, a cyclic prefix (CP) encoder (Add CP) 112 coupled to the IFFT block 110, a modulator 114 coupled to the CP encoder 112, and a real component (Re{}) block 116 coupled to the modulator 114. An output of block 116 forms an output of the transmitter 102. The transmitter 102 is preferably configurable for receiving input samples $D_{IN}$ which may comprise payload data from a data source. Although shown as separate functional blocks, at least a portion of one or more of the blocks comprising the transmitter 102 may be combined and/or integrated with one or more other functional blocks, and certain portions of the combined functional blocks may be shared, as will be understood by those skilled in the art.

Like the transmitter 102, the illustrative receiver 106 maybe described in terms of functional blocks, including a demodulator 118 coupled to an input of the receiver, a filter 120 coupled to an output of the demodulator 118, a rotor block 126 coupled to an output of the filter 120, a CP decoder (Remove CP) 128 coupled to an output of the rotor 126, a fast Fourier transform (FFT) block 130 coupled to an output of the CP decoder 128, a frequency domain equalizer (FDQ) 132 coupled to an output of the FFT block 130, a slicer 134 coupled to an output of the FDQ 132, the output of the FDQ preferably forming an output of the receiver 106, and a CFO estimator 124 coupled in a feedback configuration between the output of the FDQ 132 and the rotor 126. The CFO estimator 124 and the rotor 126 form an exemplary CFO compensator 122, in accordance with one aspect of the invention. Preferably, data output DOUT from the receiver 106 substantially matches the original data input DIN presented to the transmitter 102. Although shown as separate functional blocks, at least a portion of one or more of the blocks comprising the receiver 106 may be combined and/or integrated with one or more other functional blocks, and certain portions of the combined functional blocks may be shared, as will be understood by those skilled in the art.

On the transmitter side, the input samples DIN are fed to the QAM block 108 where they are mapped onto, for example, a 16-bit QAM (16-QAM) or 64-bit QAM (64-QAM) complex signal constellation (i.e., phasor or vector representation). It is to be appreciated that alternative mapping schemes, such as, for example, binary phase shift keying (BPSK) or quadrature phase shift keying (QPSK), are similarly contemplated. The QAM block 108 generates a sequential series of carriers (e.g., 64 carriers in the case of 64-QAM), which maybe referred to as OFDM symbols X(k), that are fed to the IFFT block 110. The IFFT block 110 receives the OFDM symbols X(k) and transforms them into a corresponding time domain sequence x(n) according to the expression $$x(n) = \frac{1}{N}\sum_{k=-N/2}^{N/2} X(k)e^{(j2\pi nk/N)} \quad n = 0, 1, 2 \ldots N-1 \quad (1)$$

where n is the sample number and N is an integer greater than or equal to one. The transmitter 102 may also include a trellis encoder (not shown) operatively connected between the QAM block 108 and the IFFT block 110.

The CP encoder 112 receives the time domain sequence x(n) generated by the IFFT block 110 and adds the CP, typically used to reduce inter-symbol interference (ISI). The CP encoder 112 generally copies the first m words in the sequence and appends the m words to the end of the sequence to generate a transmit data sequence. The value of m is a fixed integer greater than zero corresponding to the data transmission standard employed. For example, in accordance with the IEEE 802.11a and 802.11g standards, m is typically 64. The baseband transmit data samples x(t) are then converted into a passband signal by modulating the samples with a carrier frequency fc in modulator block 114. Block 116 removes the imaginary component (Im{}) of the passband signal, thereby leaving the real component (Re{}) of the signal for transmission over the channel 104. The imaginary component of the signal may be removed, for example, by shifting a phase of the signal by ninety degrees, and thus block 116 may comprise a phase shifter. The transmitted signal s(t) is of the form $$s(t) = \sqrt{2}Re\{x(t)e^{(jw_ct)}\} \quad (2)$$

where x(t) is the time domain representation of x(n) and $\omega_c$ is the carrier frequency in radians (i.e., $\omega_c = 2\pi fc$).

Since CFO is generally introduced after the signal has been transmitted, CFO estimation methodologies typically focus on the receiver rather than the transmitter. Consequently, transmitter 102 may be implemented in accordance with a conventional OFDM transmitter, as will be known by those skilled in the art. A detailed description of the operation of the transmitter 102 will therefore not be presented herein.

On the receiver side, the received signal r(t) comprising the transmitted samples is down-converted from passband to baseband by demodulator 118 using the same carrier frequency fc as used in the transmitter 102 to obtain x(t). The received signal r(t) will be of the form $$r(t)=s(t)e^{(-jw_c t)} \tag{3}$$

The baseband signal is preferably supplied to the exemplary CFO compensator 122 which, as previously stated, may comprise a rotor block 126 coupled to the output of the demodulator 118 and the CFO estimator 124. The exemplary CFO compensator 122 is configurable for receiving the baseband signal from the demodulator 118 and for modifying a phase of the baseband signal in response to a CFO estimation signal generated by the CFO estimator 124. The CFO estimation signal represents an estimation of the CFO present in the received signal, as will be explained in further detail below. In accordance with one aspect of the invention, the CFO estimation signal comprises a digital value representing phase offset between the transmitter carrier and the receiver carrier. Rotor block 126 may comprise a phase shifter for operatively rotating a phase of a given symbol by an amount substantially equal to the estimated CFO.

The exemplary receiver 106 may also include filter 120 operatively coupled between the demodulator 118 and the CFO compensator 122. The filter 120, which may comprise a low-pass filter, is preferably configurable for receiving the baseband signal from demodulator 118 and substantially removing an out-of-band gaussian noise component which may be present in the received signal.

The output of the CFO compensator 122 is fed to the CP decoder 128 which strips the cyclic prefix from the received sequence such as, for example, by removing the last m words from the sequence, where m is typically 64 according to the IEEE 802.11a and 802.11g standards, as previously stated. Although not limited to any particular decoding methodology, the CP decoder 128 is preferably substantially matched to the CP encoding scheme used in the transmitter 102.

Assuming an ideal channel response, the receiver can be configured to obtain the original samples X(k) by computing the FFT, at block 130, of samples from the CP decoder 128 according to the expression $$X(k) = \sum_{n=0}^{N-1} x(n)e^{(-j2\pi nk/N)}, \quad k = -N/2, \ldots 0, 1, 2 \ldots N/2 \tag{4}$$

This produces X(−N/2) ... X(0), X(1), X(2) ... X(N/2). However, an ideal channel response is rarely, if ever, attainable. Furthermore, the carrier frequency used in the receiver 106 to demodulate the received signal is often not exactly matched to the carrier frequency used by the transmitter 102 to modulate the signal to be transmitted, thereby creating an offset. Thus, certain non-ideal components will be introduced into the received signal as a result of the characteristics of the channel response and carrier frequency mismatch between the transmitter 102 and receiver 106.

Assuming an equivalent baseband representation of the channel response to be h(n), and assuming H(k) is the FFT of h(n), then after passing through the channel 104 the actual received samples y(n) can be expressed as $$y(n) = \frac{1}{N}\sum_{k=-N/2}^{N/2} X(k)H(k)e^{(j2\pi n(k+\varepsilon)/N)} + w(n)_{n=0,1,2\ldots N-1} \tag{5}$$

where w(n) is white gaussian noise and ε is carrier frequency offset (CFO). As previously stated, the present invention seeks to accurately estimate the CFO so that the OFDM receiver can more effectively compensate for the undesirable effects of CFO.

Assuming the FFT of y(n) is represented by Y(r), and the FFT of w(n) is represented by W(r), then Y(r) may be expressed as $$Y(r) = \sum_{n=0}^{n-1}\sum_{k=-N/2}^{k=N/2} X(k)H(k)e^{\left(\frac{j2\pi n(k+\varepsilon)}{N}\right)}e^{\left(\frac{-j2\pi nr}{N}\right)} + W(r) \tag{6}$$

$$= \frac{X(r)H(r)}{N}\sum_{n=0}^{N-1} e^{\left(\frac{-j2\pi nr}{N}+\frac{j2\pi n(r+\varepsilon)}{N}\right)} + ICI(r,\varepsilon) + W(r)$$

In equation (6) above, the ICI(r, ε) term represents inter-carrier interference caused primarily by the CFO. The ICI(r, ε) term can be expressed as $$ICI(r,\varepsilon) = \sum_{\substack{l=-K/2 \\ l\neq r}}^{l=K/2} X(l)H(l)\left[\frac{\sin\pi\varepsilon}{N\sin(\pi(1-r+\varepsilon)/N)}\right]\cdot \tag{7}$$

$$e^{\frac{j\pi\varepsilon(N-1)}{N}}e^{\frac{-j\pi(l-r)}{N}}$$

The output samples from the FFT block 130 may be fed to the FDQ 132 where they are further processed. The FDQ, which may be implemented in accordance with a conventional frequency domain equalizer or alternative circuitry, compensates for channel nulls and/or other nonlinear characteristics introduced by the channel 104 by comparing one or more received training symbols to a corresponding expected symbol. The FDQ then compensates for channel nulls by operatively shifting the phase of the received symbol to substantially match the expected symbol.

In the exemplary OFDM receiver 106, the output of the FDQ 132 is fed to the slicer 134, which may comprise, for example, a QAM demodulator. It is to be understood that the demodulation scheme utilized by the slicer 134 is preferably substantially matched to the modulation scheme used in the QAM block 108 of the transmitter 102. The slicer 134 essentially looks at a given received symbol and determines the nearest sample match in an expected constellation. The resulting output comprises a data stream $D_{OUT}$ which is ideally matched to the original input data stream $D_{IN}$ presented to the transmitter 102. The output of the FDQ 132 may also be coupled to the CFO estimator 124 such that the CFO estimator 124 is operatively connected in the exemplary receiver 106 in a feedback arrangement. The exemplary receiver 106 may also include a Viterbi decoder (not shown) operatively connected between the FDQ 132 and the slicer 134, assuming a trellis encoder is employed in the transmitter.

A method for estimating CFO will now be described, in accordance with one embodiment of the invention. Since CFO estimation is generally performed on the receiver side, the CFO estimation techniques of the present invention will be described herein in the context of the illustrative OFDM receiver 106 shown in FIG. 1.

As previously stated, the exemplary CFO compensator 122 comprises the CFO estimator 124 operatively coupled to the rotor block 126. The CFO estimator 124 is preferably configurable for receiving an output of the FDQ 132 and for determining an estimate of the CFO present in the received signal. The CFO estimation value is fed to the rotor 126 which substantially compensates for the CFO by rotating the phase of a given symbol. Three methods for CFO estimation are discussed herein, namely, time domain correlation, phase-offset estimation, and pilot tone based estimation.

Time domain correlation may be used in conjunction with the phase-offset CFO estimation methodology of the invention to provide further improvements thereof. Time domain correlation can be used during a training mode for coarse CFO estimation, wherein short and long training symbols are sent. If the baseband sampling frequency is $F_s$ and the sampling period $T_s$, then $T_s=1/F_s$ and $t=nT_s$, where n is the sample number. Assuming a substantially flat channel response, a received sample y(t) can be represented as $$y(nT_s)=x(nT_s)e^{(-j\epsilon nT_s)} \quad (8)$$

where $x(nT_s)$ represents a transmitted sample x(t). Let $\phi=pF_c/F_s$, where $F_c$ is the carrier frequency, p is the CFO in parts per million (ppm), and $\epsilon$ is frequency offset ($\epsilon=pF_c$). Substituting $\phi$ into equation (8) above yields $$y(nT_s)=x(nT_s)e^{(-j\phi n)} \quad (b\ 9)$$

During the short training period, the samples are repeated with a period of N for a given symbol, where, in the context of the IEEE 802.11a and 802.11g standards, N=16 (i.e., 16 samples per symbol). Substituting the quantity (n+N) into equation (9) above yields $$y((n+N)T_s)=x((n+N)T_s)e^{(-j\phi(n+N))}=y(nT_s)e^{(-j\phi N)} \quad (10)$$

$$\text{Let } R_{yy'} = \sum_{n=0}^{M-1} y(n)y(n+N) \quad (11)$$

$$= \sum_{n=0}^{M-1} y(n)y(n)e^{(-j\varphi N)} = R_{yy}e^{(-j\varphi N)} \quad (12)$$

The angle of the vector $R_{yy'}$ may be defined as $$\angle R_{yy'} = -\phi N \quad (13)$$

Rearranging equation (13) above yields the CFO estimation $\phi$ as $$\varphi = \frac{\angle R_{yy'}}{-N} \quad (14)$$

While the rotor block 126 in the exemplary receiver 106 preferably uses this coarse CFO estimation as a initial starting point for the phase-offset estimation technique of the invention, the training symbols sent during training mode are generally too short to obtain an accurate CFO estimation.

An exemplary phase-offset estimation methodology will now be described, in accordance with one embodiment of the present invention. The exemplary phase-offset estimation methodology, which may be performed in the CFO estimator 124, is used in the frequency domain to more accurately estimate the CFO. Moreover, the exemplary phase-offset estimation technique may be based on transmitted data symbols which are generally longer in duration, thereby allowing a more accurate CFO estimation. Moreover, since the phase-offset methodology does not require additional training symbols, a higher data throughput can advantageously be achieved.

Assuming a flat channel response, a received sample $y(nT_s)$ can be represented as $$y(nT_s)=x(nT_s)e^{(-j\phi n)} \quad (15)$$

If N is the number of samples per symbol then, $$y((n+N)T_s)=x((n+N)T_s)e^{(-j\phi(n+N))} \quad (16)$$

In equation (16) above, the quantity ($-\phi N$) represents a change in the phase error. The CFO can therefore be computed by determining the difference in the phase error between at least two symbols that are preferably consecutive. Let $\phi(i)$ be defined as $$\phi(i) = \frac{(\text{phase error } X_i \text{ in symbol } K+1) - (\text{phase error } X_i \text{ in symbol } K)}{N} \quad (17)$$

The phase offset $\phi$ averaged over all used subcarriers may be represented as $$\phi = \frac{\sum_{i=0}^{L-1} \phi(i)}{L} \quad (18)$$

where L is the total number of used subcarriers.

In sum, the exemplary CFO estimator 124 receives samples generated by the FDQ 132 and computes the difference in phase error between the expected data and the received data. The CFO estimator 124 is preferably configured to compute the phase error for a first symbol and the phase error for a subsequent symbol and calculate the CFO estimate based at least in part on the difference between the two phase errors. The rotor block 126 comprised in the CFO compensator 122 uses the averaged estimate of the phase offset to modify the phase of a given symbol in response thereto.

The rotor block 126 may comprise a simple rotating phasor given by $e^{j\phi n}$. The received sample r(n) is multiplied by the phasor $e^{j\phi n}$ to generate a modified sample r'(n) which substantially compensates for the frequency offset. Thus, the modified sample r'(n) may be represented as $$r'(n)=r(n)e^{(j\phi n)} \quad (19)$$

In a data mode, the exemplary receiver 106 may employ a pilot tone based estimation methodology in conjunction with the phase-offset CFO estimation technique of the present invention to provide further improvements thereof. Instead of using the phase error, an exemplary pilot tone estimation method uses a maximum likelihood (ML) estimation of the known pseudo-random pilot signal in order to compute the phase error. The CFO term $\epsilon$ can be computed based on the angle of the error vector. In this instance, the angle of rotation $\epsilon$ is fed back to the CFO compensator 122 to compensate for the frequency offset.

Figure 2:
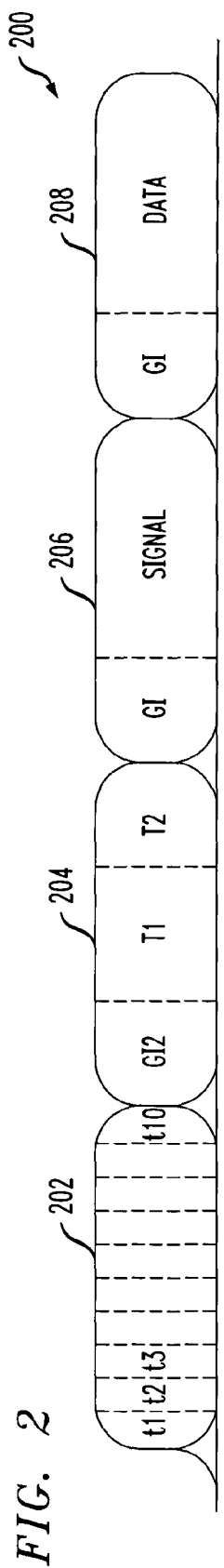
FIG. 2 is an illustration depicting at least a portion of a WLAN training sequence.

In the context of an IEEE 802.11 WLAN system, in order to reduce the effect of CFO, short and long training symbols are typically sent. FIG. 2 depicts an illustrative transmitted sequence 200 comprising a plurality of symbols according to the IEEE 802.11 standard. The transmitted sequence 200 comprises a short symbol portion 202, a long symbol portion 204, a signal portion 206 and a data portion 208. The short symbols, namely, t1 through t10 may be used for automatic gain control (AGC) training, frame synchronization and coarse CFO estimation. Each short symbol generally includes four sine waves superimposed on one another. As the first symbol t1 is often corrupted by multi-path distortion, it is generally discarded. The remaining nine short symbols t2–t10 are used for coarse CFO estimation, for example, using a time domain correlation methodology, as previously described.

The long symbols T1 and T2 are preceded by a guard interval GI2 which is twice the size of a normal guard interval (e.g., GI). The guard interval GI2, which is essentially a cyclic prefix for the longer training symbols T1 and T2, reduces the effect of inter-symbol interface (ISI) and the symbols T1 and T2 can be used for fine CFO estimation. Typically, GI2 comprises the first half of symbol T1 repeated twice, and symbol T1 is generally the same as symbol T2. Likewise, the signal portion 206 and the data portion 208 of the transmitted sequence 200 preferably comprise a cyclic prefix GI The filter 120 in the receiver 106 shown in FIG. 1 may comprise a matched filter which can be used to determine the symbol synchronization. After symbol synchronization and AGC computation, the CFO may be estimated using cross-correlation between consecutive periods (e.g., t2 and t3).

During the short training period which utilizes the short symbol portion 202 of the transmitter sequence 200, an initial estimate for the CFO $\phi$ is preferably computed by using the time domain correlation method and equation (14), although alternative estimation methods may also be employed. During the long training period which utilizes the long symbol portion 204 of the transmitted sequence 200, the receiver may use long symbols T1 and T2 to perform fine CFO estimation and to compute the frequency domain equalization. Equation (14), which was used to compute the coarse CFO estimation, can also be used to compute the fine CFO estimation, but as the long symbols have 64 samples, N is set to 64. This value may be added to the coarse offset to generate a more accurate initial CFO estimation used by the CFO compensator 122 in the exemplary receiver 106 of FIG. 1.

In accordance with the phase-offset estimation methodology of the present invention previously described, the phase error between each subcarrier of two adjacent symbols is preferably used to compute a residual phase error which will result in a more accurate CFO estimation. The average of the phase error between these subcarriers yields an estimate of the phase error between corresponding adjacent symbols and, using equation (17), a CFO estimate is computed. This estimate is added to the CFO estimate obtained using time domain correlation and/or pilot tone based estimation and is used by the rotor block 126 in the CFO compensator 122 of receiver 106 (see FIG. 1) to compensate for CFO. In accordance with a preferred embodiment of the invention, only the subcarriers which are used for data transmission and/or for pilot tone based estimation are used to estimate the phase offset. Averaging of the phase offset provides a superior CFO estimate compared with conventional CFO estimation methods since some of the subcarriers may reside in spectral nulls caused at least in part by multipath distortion.

The pilot tone based CFO estimation scheme relies on four pilot tones sent using DPSK modulation of a known pseudo-random sequence in accordance with the IEEE 802.11a standard. These four pilot tones occupy channels −7, −21, 7 and 21 and are sent in conjunction with every data symbol. The receiver, using pilot tone base estimation, estimates the phase error based on the pilot tones and computes the CFO therefrom, as previously explained. The phase error of each received pilot tone is computed and the error is averaged over the four tones. The CFO estimate is then used by the rotor block 126 in CFO compensator 122 (see FIG. 1) to adjust the phase of a given symbol accordingly, which thereby compensates for the CFO error. However, the pilot tone based CFO estimation approach reduces the data payload as it uses four out of the 52 available tones. This corresponds to about an eight percent (8%) reduction in data throughput. A comparison of pilot tone based CFO estimation and phase-offset CFO estimation is discussed below in connection with FIGS. 3 and 4.

Exemplary Simulation Results

Figure 3:
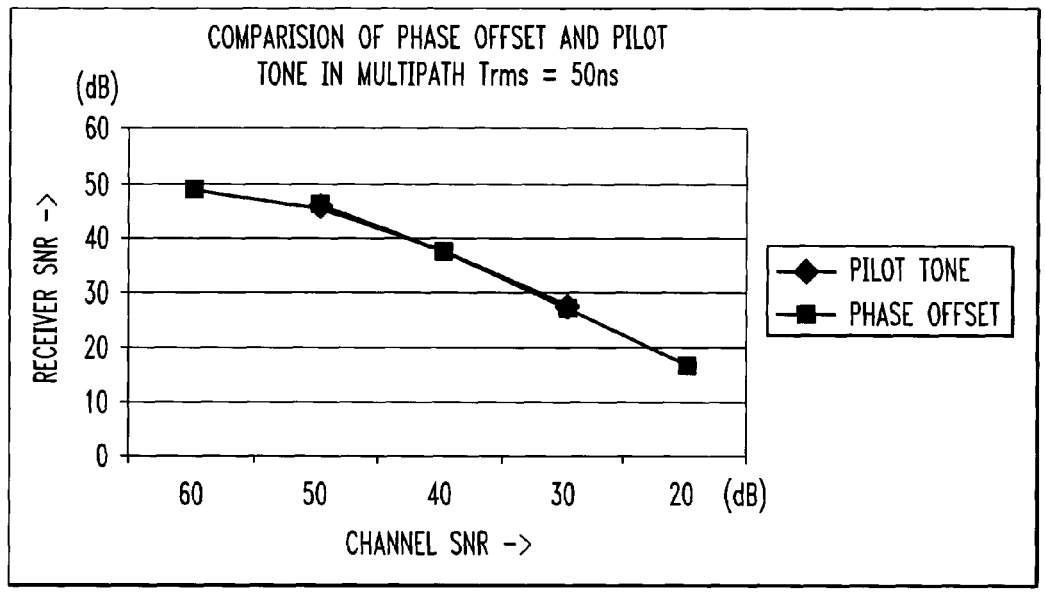
FIG. 3 is a graphical illustration depicting a comparison of receiver signal-to-noise ratio (SNR) in multipath channels, in accordance with the present invention.
Figure 4:
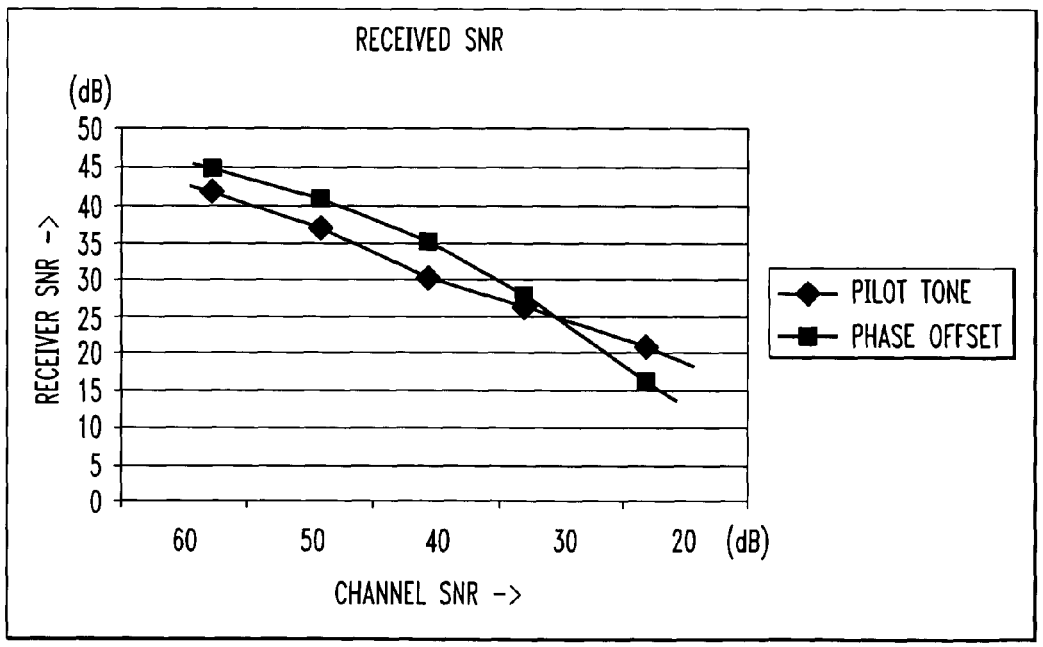
FIG. 4 is a graphical illustration depicting a comparison of receiver SNR and channel SNR for a predetermined CFO amount, in accordance with the present invention.

FIGS. 3 and 4 are graphical illustrations of exemplary simulation results comparing pilot tone based estimation and phase-offset estimation. The exemplary OFDM system 100 described in FIG. 1 was used to obtain the simulations. The short training symbol as described in section 4 was sent followed by the long training symbol. This was followed by the data symbols. Phase noise is assumed to be negligible and symbol timing is assumed to be exact. The channel model is described in Steve Halford, Karen Halford and Mark Webster, "Evaluating the performance of HRb Proposals in the presence of Multipath," IEEE 802.11-00/282r2 (September 2000). Additive white gaussian noise (AWGN) was added in the channel and the amount of noise added is referred to as channel SNR. Fixed point FFT and IFFT models were used for the simulations. The SNR at the receiver was computed using the expression $$SNR[i] = 10\log_{10}\left(\frac{\Sigma e_1^2}{\Sigma S_1^2}\right) \quad (20)$$

where e is the error vector and S is the received signal.

FIG. 3 shows a comparison of the phase-offset based CFO estimation method and the pilot tone based CFO estimation method in the presence of multipath with a root-mean-square (RMS) delay spread $T_{RMS}$ of 50 nanoseconds (ns). The RMS delay spread is a measure of multipath spread within the channel. As apparent from the figure, both methods perform similarly until the SNR drops below 30 dB. At 30 dB and below the size of the constellation, which the pilot-tone method supports was 64-QAM while that the phase-offset based method could support was 16-QAM.

FIG. 4 shows a comparison of receiver performance for phase-offset based CFO estimation and pilot tone based CFO estimation in the presence of multipath with a $T_{RMS}$ of 150 ns. For high channel SNR (e.g., greater than about 30 decibels (dB)), the phase offset method is superior to the pilot tone based method. This is due, at least in part, to the fact that the pilot tones are adversely affected by the spectral nulls of the channel, while in the phase offset method not all the subcarriers are affected.

It is to be appreciated that a circuit for performing the methodologies of the present invention as described herein may be implemented, at least in part, in a semiconductor device, which may comprise more than one such circuit. Moreover, portions of the circuit may be implemented in two or more semiconductor devices configurable for operating in conjunction with one another, such as, for example, in a chip set for implementing the methodologies of the invention, as will be understood by those skilled in the art.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. For example, the invention can be used with standards other than IEEEE 802.11 (e.g., IEEE 802.15), as well as in non-standard applications. Moreover, the particular assumptions made above in the context of describing the illustrative embodiments should not be construed as requirements of the invention, and need not apply in other embodiments thereof.

What is claimed is:

1. An orthogonal frequency division multiplexing receiver, comprising:
   a demodulator configurable for receiving a passband signal including a plurality of symbols, at least one of the symbols being a reference symbol, and converting the passband signal to a baseband signal;
   a carrier frequency offset (CFO) compensation circuit configurable for receiving the baseband signal and modifying a phase of the baseband signal in response to a first control signal;
   a transformation circuit configurable for translating the baseband signal from the CFO compensation circuit into a frequency domain constellation;
   an equalizer configurable for receiving the frequency domain constellation and modifying the frequency domain constellation based at least in part on the reference symbol; and
   a CFO estimation circuit operatively coupled between an output of the equalizer and the CFO compensation circuit in a feedback configuration, the CFO estimation circuit being configurable for measuring a difference in phase error between at least two symbols received from the equalizer and for generating the first control signal, the first control signal being representative of the phase error difference.

2. The receiver of claim 1, wherein the at least two symbols received from the equalizer comprise consecutive symbols.

3. The receiver of claim 1, wherein the transformation circuit comprises a fast Fourier transform circuit.

4. The receiver of claim 1, wherein the CFO compensation circuit comprises a rotor configurable for receiving the first control signal and for shifting a phase of a symbol by an amount substantially equal to the phase error difference.

5. The receiver of claim 1, further comprising a filter coupled between the demodulator and the CFO compensation circuit, the filter being configurable to substantially remove an out-of-band gaussian noise component associated with the received passband signal.

6. The receiver of claim 5, wherein the filter is a low-pass filter.

7. The receiver of claim 1, further comprising a cyclic prefix (CP) decoder operatively coupled between the CFO compensation circuit and the equalizer, the CP decoder being configurable for removing a predetermined number of words from an end of each symbol in the received passband signal.

8. The receiver of claim 1, further comprising a slicer circuit coupled to the output of the equalizer, the slicer being configurable for measuring a signal constellation corresponding to a given symbol, determining a nearest match between a data sample in an expected constellation and a sample in the measured signal constellation, and generating an output data stream comprising samples representative of the nearest match.

9. The receiver of claim 8, wherein the slicer circuit comprises a quadrature amplitude demodulator.

10. The receiver of claim 8, further comprising a Viterbi decoder operatively coupled between equalizer and the slicer circuit.

11. The receiver of claim 8, wherein the first control signal is based at least in part on a difference between the data sample in the expected constellation and the sample in the measured signal constellation.

12. The receiver of claim 1, wherein the at least two symbols received from the equalizer comprise data symbols.

13. A method for estimating carrier frequency offset (CFO) in a wireless communication system, the method comprising the steps of:
   receiving a passband signal including a plurality of symbols, at least one of the symbols being a reference symbol;
   converting the passband signal to a baseband signal;
   translating the baseband signal into a frequency domain constellation;
   modifying the frequency domain constellation based at least in part on the reference symbol;
   measuring a difference in phase error between at least two received symbols;
   generating a first control signal, the first control signal being representative of the phase error difference; and
   modifying a phase of the baseband signal in response to the first control signal.

14. The method of claim 13, wherein the at least two symbols comprise consecutive symbols.

15. The method of claim 13, wherein the step of translating the baseband signal into a frequency domain constellation comprises computing a fast Fourier transform (FFT) of the baseband signal.

16. The method of claim 13, further comprising the step of substantially removing an out-of-band gaussian noise component associated with the received passband signal.

17. The method of claim 13, further comprising the step of removing a predetermined number of words from an end of each symbol in the received passband signal.

18. The method of claim 13, further comprising the steps of:
   measuring a signal constellation corresponding to a given symbol;
   determining a nearest match between a data sample in an expected constellation and a sample in the measured signal constellation; and
   generating an output data stream comprising samples representative of the nearest match.

19. The method of claim 18, wherein the first control signal is based at least in part on a difference between the data sample in the expected constellation and the sample in the measured signal constellation.

20. The method of claim 13, wherein the step of modifying a phase of the baseband signal comprises shifting a phase of a symbol by an amount substantially equal to the phase error difference.

21. A semiconductor device for estimating carrier frequency offset (CFO) in a wireless communication system, the semiconductor device comprising:

a demodulator configurable for receiving a passband signal including a plurality of symbols, at least one of the symbols being a reference symbol, and converting the passband signal to a baseband signal;

a carrier frequency offset (CFO) compensation circuit configurable for receiving the baseband signal and modifying a phase of the baseband signal in response to a first control signal;

a transformation circuit configurable for translating the baseband signal from the CFO compensation circuit into a frequency domain constellation;

an equalizer configurable for receiving the frequency domain constellation and modifying the frequency domain constellation based at least in part on the reference symbol; and a CFO estimation circuit operatively coupled between an output of the equalizer and the CFO compensation circuit in a feedback configuration, the CFO estimation circuit being configurable for measuring a difference in phase error between at least two symbols received from the equalizer and for generating the first control signal, the first control signal being representative of the phase error difference.

* * * * *